Patented Sept. 21, 1943

2,329,884

UNITED STATES PATENT OFFICE 2,329,884

METHOD OF PREVENTING GROWTH OF FUNGI

Morris H. Daskais, Chicago, Ill., assignor to Research Corporation, a corporation of New York No Drawing. Original application October 9, 1939, Serial No. 298,635. Divided and this application November 23, 1942, Serial No. 466,664

10 Claims. (Cl. 167—22)

The present invention relates to a method of preventing the growth of fungi on plant material by the use of a new series of mercuri-acetylide compounds. It will be fully understood from the following description, illustrated by specific examples of compounds which may be used in accordance with the present invention.

This application is a division of my copending application Serial No. 298,635, filed October 9, 1939.

The compounds which may be used in accordance with the present invention are a new series of mercuri-acetylide compounds which are characterized by solubility in dilute aqueous alkaline solutions or water or both, as well as various organic solvents. These compounds may be prepared by reacting a mercuri-acetylide compound of the general formula

in which $R_1$ represents an alkyl group and $R_2$ a hydrocarbon radical of the class consisting of the aliphatic and alicyclic groups with an organic nitrogen compound generally which has an amido or imido radical containing a replaceable labile or acidic hydrogen atom, thereby replacing the $R_1$—O— or alkoxy group of the mercuri-acetylide compound. Organic nitrogen compounds having the characteristics above set forth which I have employed in carrying out my reaction include the amides and imides of carboxylic and sulfonic acids, and also various pyrroles and pyrrole derivatives, morpholine and the like. For example, I have used acetamide, propionamide, urea, benzamide, salicylamide, phthalimide, succinimide, 5,5-diethylbarbituric acid, benzene sulfonamide, amino-benzene sulfonamide, paratoluene sulfonamide, morpholine, carbazole, and pyrrole.

The reaction is preferably conducted in the presence of an organic solvent in which the reactants are partially or completely soluble. It is preferred that the solvent selected has a boiling point below the melting point of the mercuri-acetylide compound used in the reaction and that the reactants be completely dissolved, although these conditions are not essential. The solvent does not appear to take part in the reaction. For example, methanol, ethanol, isopropanol, sec.-butanol, toluol, benzol, methyl ethyl ketone, acetone, butyl or ethyl acetates or propionates or the like may be employed as solvents.

In the resulting compounds, one valence of each mercury atom is bonded to an acetylenic carbon atom and the other to a carbon atom of a hydrocarbon group which is apparently bonded to a nitrogen atom of an organic nitrogen compound and preferably to a nitrogen atom of an amido or imido group in the organic nitrogen compound. This structure is indicated by the fact that, when reacted upon with sodium stannite, the compounds produced yield metallic mercury very slowly as contrasted with compounds having a mercury nitrogen linkage, which, with the same reagent yield metallic mercury quickly.

The compounds which may be used in accordance with my invention have the probable general formula

wherein (A)— is an organic nitrogen-containing group of the class consisting of substituted amido and substituted imido groups and R is a hydrocarbon radical of the class consisting of the aliphatic and alicyclic hydrocarbon radicals, the nitrogen atom of the nitrogen-containing group being bonded to a carbon atom of the hydrocarbon radical. They are of particular value as germicides and fungicides, for example, in the treatment of wood, in cut or uncut form to prevent fungus diseases such as "blue stain" on lumber, and in the treatment of seed to disinfect and immunize the same against infection. These compounds are substantially odorless and, for all practical purposes, are non-corrosive to iron, hence lending themselves for use in iron machinery and the like. An outstanding advantage of the compounds in accordance with my invention is the fact that they are non-vesicant and do not irritate or cause blistering of the skin, thereby enabling them to be handled without fear of injuriously affecting the operator or user. I have found that seeds can tolerate large amounts of the compounds of my invention and the treated seed is stable and undergoes substantially no deterioration in storage.

The following examples illustrate methods of preparing these soluble organic mercury compounds. It is, of course, to be understood that my invention is not to be construed as limited to the compounds therein set forth or to the methods of making them since other compounds and other methods will suggest themselves from the foregoing and from the following illustrative examples. In the examples, the term "parts" indicates parts by weight.

*Example 1*

20 parts of bis-beta-methoxyethyl-mercuri-acetylene and 13 parts of phthalimide are dissolved in about 300 parts of isopropyl alcohol. The solution is refluxed for about two hours, at which time the reaction is completed, and the solvent is removed as by vacuum distillation. The reaction product, apparently the compound bis-beta-phthalimido-N-ethyl-mercuri-acetylene, is dried in vacuo. The compound is soluble in warm aqueous sodium carbonate and in boiling water. It sinters at 142° C. and melts completely at 166° C.

In tests conducted by me I have found that this compound will kill the "sap stain" fungi, *Ceratostomella pilifera* and *Graphium rigidum* in a nutrient agar medium in a concentration less than 1 part per million. This reaction product is also toxic to the wood rotters, *Fomes annosus* and *Lenzites trabea* in concentrations of one-half part per million.

The compound bis-beta-phthalimido-N-ethyl-mercuri-acetylene is effective as a "blue stain" preventative. Thus, for example, a mixture containing 5% to 10% of this compound and 95% to 90% of sodium carbonate is dissolved in about 400 times its weight in water to form an impregnating solution which is especially suitable for this purpose. The wood, either "green" or partially dried, is dipped into this impregnating solution and the wood is thereby protected against the action of stain and rot fungi.

This phthalimido compound is also especially suitable as a dry seed disinfectant. For this purpose, it is mixed with the usual inert diluents such as, for example, talc, starch, kieselguhr, chalk, clay or gypsum, with or without a wetting agent. Thus, for example, a uniform and intimate mixture of about 5 parts by weight of bis-beta-phthalimido-N-ethyl-mercuri-acetylene in about 95 parts of talc provides a highly effective immunizer against seed-borne fungus diseases when used in the ratio of about one-half to about 2 ounces per bushel of seed.

*Example 2*

10 parts of bis-beta ethoxyethyl-mercuri-acetylene and 3 parts of urea are dissolved in about 200 parts of sec.-butyl alcohol. The solution is refluxed for about 2½ hours, at which time the reaction is complete, and the solvent is removed as by vacuum distillation. The reaction product is dried with the formation of a white crystalline material which melts at 95° C. It appears to have the formula NH₂—CO—NH—CH₂—CH₂—Hg—C≡
C—Hg—CH₂—CH₂—NH—CO.NH₂

The product is readily soluble in cold water, sodium carbonate and caustic soda solutions as well as in acetone, methanol and ethanol. The compound does not deposit mercuric oxide when treated with caustic soda and yields metallic mercury slowly on the addition of sodium stannite. It is an excellent germicide and fungicide although not quite as effective as the compound of Example 1.

By suitable control of the proportions of the same reactants so that only one molecule of urea reacts with the alkoxyalkyl-mercuri-acetylene, a compound having the apparent formula

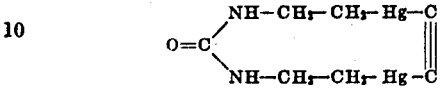

may be produced. Similarly, by reaction with the diamides of other dibasic acids of the dicarboxylic and disulfonic classes, other similar cyclic compounds may be produced, such as

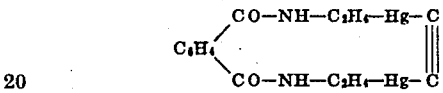

*Example 3*

10 parts of bis-gamma-methoxypropyl-mercuri-acetylene and 4 parts of succinimide are dissolved in about 200 parts of dioxan. The solution is refluxed for about two hours at which time the reaction is complete, and the solvent is removed as by vacuum distillation. The reaction product, which appears to have the formula

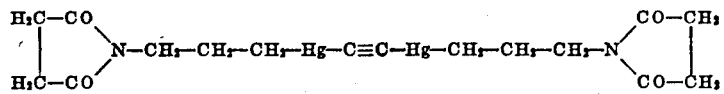

is dried in vacuo. The product is soluble in water, aqueous sodium carbonate, acetone, methanol and is an effective germicide and fungicide. In general, it has substantially the properties of the compound of Example 2.

If desired, the compounds bis-beta-ethoxyethyl-mercuri-acetylene, bis-delta-propyloxybutyl-mercuri-acetylene, bis-cyclohexyloxyethyl-mercuri-acetylene and the like may be reacted with succinimide as in Example 2 to obtain products similar to that obtained in accordance with this example.

*Example 4*

10 parts of bis-methoxy-cyclohexyl-mercuri-acetylene and 2.5 parts of acetamide are dissolved in about 150 parts of sec.-butyl acetate. The solution is refluxed for about two hours, at which time the reaction is completed, and the solvent is removed by vacuum distillation. The reaction product is dried in vacuo. It appears to have the formula:

CH₃—CO—NH—C₆H₁₀—Hg—C≡
C—Hg—C₆H₁₀—NH—CO—CH₃

The compound produced in accordance with this example has substantially the properties of the compounds produced in accordance with the preceding examples.

*Example 5*

10 parts of bis-beta-methoxyethyl-mercuri-acetelene and 6 parts of benzene sulfonamide are dissolved in about 200 parts of toluene. The solution is refluxed for about two hours, at which time the reaction is complete, and the solvent is removed as by vacuum distillation. The reaction product is dried with the formation of a white crystalline powder which appears to have the probable formula:

C₆H₅—SO₂—NH—CH₂—CH₂—Hg—C≡
C—Hg—CH₂—CH₂—NH—SO₂—C₆H₅

The compound produced in accordance with this example has substantially the properties of the compounds produced in accordance with the preceding examples.

I claim:

1. The method of preventing and controlling the growth of fungi on plant material and of disinfecting the same which comprises applying thereto a symmetrical organic mercury compound of the general structural formula (A)—R—Hg—C≡C—Hg—R—(A)

wherein (A) is an organic nitrogen-containing radical of the class consisting of the radicals —CO—N—  and  —SO₂—N—
    |                      | and R is a hydrocarbon radical of the class consisting of the aliphatic and alicyclic hydrocarbon radicals, the nitrogen atom of the nitrogen-containing radical (A) being bonded to a carbon atom of the hydrocarbon radical R.

2. The method of preventing and controlling the growth of fungi on plant material and of disinfecting the same which comprises applying thereto an aqueous solution containing a symmetrical organic mercury compound of the general structural formula (A)—R—Hg—C≡C—Hg—R—(A)

wherein (A) is an organic nitrogen-containing radical of the class consisting of the radicals —CO—N—  and  —SO₂—N—
    |                      | and R is a hydrocarbon radical of the class consisting of the aliphatic and alicyclic hydrocarbon radicals, the nitrogen atom of the nitrogen-containing radical (A) being bonded to a carbon atom of the hydrocarbon radical R.

3. The method of treating seed to control and prevent the growth of fungi thereon and to disinfect the seed which comprises applying thereto an effective proportion of a symmetrical organic mercury compound of the general structural formula (A)—R—Hg—C≡C—Hg—R—(A)

wherein (A) is an organic nitrogen-containing radical of the class consisting of the radicals —CO—N—  and  —SO₂—N—
    |                      | and R is a hydrocarbon radical of the class consisting of the aliphatic and alicyclic hydrocarbon radicals, the nitrogen atom of the nitrogen-containing radical (A) being bonded to a carbon atom of the hydrocarbon radical R.

4. The method of treating lumber to control and prevent the growth of blue stain and like fungous disease thereon which comprises applying thereto a solution of a symmetrical organic mercury compound of the general structural formula (A)—R—Hg—C≡C—Hg—R—(A)

wherein (A) is an organic nitrogen-containing radical of the class consisting of the radicals —CO—N—  and  —SO₂—N—
    |                      | and R is a hydrocarbon radical of the class consisting of the aliphatic and alicyclic hydrocarbon radicals, the nitrogen atom of the nitrogen-containing radical (A) being bonded to a carbon atom of the hydrocarbon radical R.

5. The method of preventing and controlling the growth of fungi on plant material and of disinfecting the same which comprises applying thereto a symmetrical organic mercury compound of the general formula (A)—R—Hg—C≡C—Hg—R—(A)

wherein (A) is an organic radical containing an imido nitrogen atom and R is a hydrocarbon radical of the class consisting of the aliphatic and alicyclic hydrocarbon radicals, the said nitrogen atom of radical (A) being bonded to a carbon atom of the hydrocarbon radical R.

6. The method of preventing and controlling the growth of fungi on plant material and of disinfecting the same which comprises applying thereto a symmetrical organic mercury compound of the general formula (A)—R—Hg—C≡C—Hg—R—(A)

wherein (A) is an organic radical containing an imido nitrogen atom bonded to an acyl group of said organic radical and R is a hydrocarbon radical of the class consisting of the aliphatic and alicyclic hydrocarbon radicals, the said nitrogen atom of radical (A) being bonded to a carbon atom of the hydrocarbon radical R.

7. The method of preventing and controlling the growth of fungi on plant material and of disinfecting the same which comprises applying thereto the compound bis-beta-phthalimido-N-ethyl-mercuri-acetylene.

8. The method of preventing and controlling the growth of fungi on plant material and of disinfecting the same which comprises applying thereto an alkaline aqueous solution containing the compound bis-beta-phthalimido-N-ethyl-mercuri-acetylene.

9. The method of preventing and controlling the growth of fungi on plant material and of disinfecting the same which comprises applying thereto the compound having the general formula NH₂—CO—NH—CH₂—CH₂—Hg—C≡
                C—Hg—CH₂—CH₂—NH—CO—NH₂

10. The method of preventing and controlling the growth of fungi on plant material and of disinfecting the same which comprises applying thereto the compound having the general formula C₆H₅—SO₂—NH—CH₂—CH₂—Hg—C≡
                C—Hg—CH₂—CH₂—NH—SO₂—C₆H₅

MORRIS H. DASKAIS.